United States Patent
Steedman et al.

(10) Patent No.: US 11,261,747 B2
(45) Date of Patent: Mar. 1, 2022

(54) CERAMIC MATRIX COMPOSITE VANE WITH ADDED PLATFORM

(71) Applicant: Rolls-Royce plc, London (GB)

(72) Inventors: Emma C. Steedman, London (GB);
Michael J. Whittle, London (GB);
Edward M. Jones, London (GB);
James C. Smith, London (GB)

(73) Assignee: Rolls-Royce plc

( * ) Notice: Subject to any disclaimer, the term of this patent is extended or adjusted under 35 U.S.C. 154(b) by 82 days.

(21) Appl. No.: 16/415,172

(22) Filed: May 17, 2019

(65) Prior Publication Data

US 2020/0362712 A1 Nov. 19, 2020

(51) Int. Cl.
*F01D 9/04* (2006.01)
*F01D 5/14* (2006.01)
*F01D 5/28* (2006.01)

(52) U.S. Cl.
CPC .......... *F01D 9/041* (2013.01); *F01D 5/147* (2013.01); *F01D 5/284* (2013.01); *F05D 2300/6033* (2013.01)

(58) Field of Classification Search
CPC .......... F01D 9/041; F01D 9/042; F01D 5/147; F01D 5/284; F01D 25/28; F01D 11/001; F01D 11/02; F05D 2300/6033; F05D 2240/125
See application file for complete search history.

(56) References Cited

U.S. PATENT DOCUMENTS

| | | | | |
|---|---|---|---|---|
| 4,026,659 | A | * | 5/1977 | Freeman, Jr. ........... F01D 5/186 415/115 |
| 4,218,179 | A | * | 8/1980 | Barry ...................... F01D 5/189 415/114 |
| 4,396,349 | A | * | 8/1983 | Hueber ................... F01D 5/284 415/115 |
| 5,273,393 | A | * | 12/1993 | Jones ..................... F01D 21/045 415/9 |
| 5,630,700 | A | * | 5/1997 | Olsen ..................... F01D 9/042 415/134 |
| 7,540,709 | B1 | | 6/2009 | Ebert |
| 7,600,970 | B2 | * | 10/2009 | Bhate ..................... F01D 5/284 415/191 |
| 8,240,986 | B1 | | 8/2012 | Ebert |
| 8,292,580 | B2 | * | 10/2012 | Schiavo ................. F01D 5/189 416/96 A |
| 9,309,783 | B2 | | 4/2016 | Nallam et al. |
| 9,314,844 | B2 | * | 4/2016 | Geiger ................... B33Y 10/00 |
| 9,631,515 | B2 | | 4/2017 | Oyarbide et al. |
| 10,053,998 | B2 | | 8/2018 | Vo et al. |
| 10,107,117 | B2 | * | 10/2018 | Carr ....................... F01D 25/246 |
| 10,233,764 | B2 | * | 3/2019 | Thomas ................. F01D 9/042 |

(Continued)

FOREIGN PATENT DOCUMENTS

EP 0420243 A1 * 4/1991 ............ F01D 9/065
GB 2129503 A * 5/1984 ............ F01D 5/284

*Primary Examiner* — David E Sosnowski
*Assistant Examiner* — Wayne A Lambert
(74) *Attorney, Agent, or Firm* — Barnes & Thornburg LLP (57) ABSTRACT

A turbine vane assembly adapted for use in a gas turbine engine includes an aerofoil configured to interact with gases flowing through the gas turbine engine along a gas path, an outer platform that defines an outer boundary of a gas path, and an inner platform that defines an inner boundary of the gas path.

13 Claims, 3 Drawing Sheets

(56) References Cited

U.S. PATENT DOCUMENTS

| | | | |
|---|---|---|---|
| 10,711,621 B1* | 7/2020 | Whittle | F01D 9/041 |
| 10,808,560 B2* | 10/2020 | Sippel | F01D 11/001 |
| 2009/0238683 A1 | 9/2009 | Alvanos et al. | |
| 2010/0132370 A1* | 6/2010 | Durocher | F01D 25/243 60/796 |
| 2010/0132371 A1* | 6/2010 | Durocher | F01D 25/28 60/796 |
| 2010/0275572 A1* | 11/2010 | Durocher | F01D 25/18 60/39.08 |
| 2014/0004293 A1* | 1/2014 | Grooms, II | F01D 9/065 428/99 |
| 2014/0013770 A1* | 1/2014 | Farah | F01D 25/16 60/796 |
| 2017/0022829 A1* | 1/2017 | Freeman | F01D 9/041 |
| 2019/0390558 A1* | 12/2019 | Sippel | F01D 9/065 |
| 2020/0080429 A1* | 3/2020 | Vetters | F01D 11/08 |

* cited by examiner

CERAMIC MATRIX COMPOSITE VANE WITH ADDED PLATFORM

FIELD OF THE DISCLOSURE

The present disclosure relates generally to vane assemblies for gas turbine engines, and more specifically to vanes that comprise ceramic materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine are conducted toward aerofoils included in stationary vanes and rotating blades of the turbine. The aerofoils are often made from high-temperature resistant materials and/or are actively cooled by supplying relatively cool air to the vanes and blades due to the high temperatures of the combustion products. To this end, some aerofoils for vanes and blades are incorporating composite materials adapted to withstand very high temperatures. Design and manufacture of vanes and blades from composite materials presents challenges because of the geometry and strength desired for the parts.

SUMMARY

The present disclosure may comprise one or more of the following features and combinations thereof.

A turbine vane assembly for a gas turbine engine may include a ceramic matrix composite vane, a metallic support strut, and a metallic reinforcement platform. The ceramic matrix composite vane may be adapted to conduct hot gases flowing through a gas path of the gas turbine engine around the turbine vane assembly during use of the turbine vane assembly. The ceramic matrix composite vane may include an outer platform that defines an outer boundary of the gas path, an inner platform spaced apart radially from the outer platform relative to an axis to define an inner boundary of the gas path, and an aerofoil that extends radially between and interconnects the outer platform and the inner platform. The aerofoil may be formed to define an interior cavity that extends radially through the aerofoil.

The metallic support strut may be located in the interior cavity formed in the aerofoil. The metallic support strut may be configured to receive force loads applied to the ceramic matrix composite vane by the hot gases during use of the turbine vane assembly.

The metallic reinforcement platform may be coupled with the metallic support strut to locate the metallic reinforcement platform radially between the inner platform of the ceramic matrix composite vane and the axis. A portion of the force loads may be applied to the metallic reinforcement platform instead of the inner platform during use of the turbine vane assembly. The portion of the force loads may be transferred from the metallic reinforcement platform to the metallic support strut so that a total amount of the force loads applied to the ceramic matrix composite vane is reduced.

In some embodiments, the turbine vane assembly further includes an inner seal configured to block gas from passing between the inner seal and a rotor located adjacent the inner seal. The inner seal may be coupled with the metallic support strut to locate the metallic reinforcement platform radially between the inner platform and the inner seal.

In some embodiments, the metallic reinforcement platform may be spaced apart radially from the inner platform to define a first chamber radially between the metallic reinforcement platform and the inner platform. The inner seal may be spaced apart radially from the metallic reinforcement platform to define a second chamber radially between the metallic reinforcement platform and the inner seal.

In some embodiments, the metallic reinforcement platform may include a wall and a lip. The wall may extend axially and circumferentially and the lip may extend radially away from the wall toward the axis and circumferentially. The lip may engage the inner seal to block axial fluid flow between the inner seal and the metallic reinforcement platform.

In some embodiments, the turbine vane assembly further includes a buffer seal. The buffer seal may be coupled with the metallic support strut to locate the metallic reinforcement platform radially between the buffer seal and the inner platform. The buffer seal may include an axial wall and a seal flange that extends radially outward away from the axial wall and toward the metallic reinforcement platform to block axial fluid flow between the buffer seal and the metallic reinforcement platform.

In some embodiments, the metallic reinforcement platform may include a wall and a lip. The wall may extend axially and circumferentially. The lip may extend radially away from the wall toward the axis and circumferentially relative to the axis.

In some embodiments, the metallic reinforcement platform may axially and circumferentially surround the metallic support strut. In some embodiments, the entire metallic reinforcement platform may be spaced apart from the inner platform. In some embodiments, the metallic reinforcement platform may be cantilevered from the metallic support strut in an axial fore direction and in an axial aft direction.

According to another aspect of the present disclosure, a turbine vane assembly may include a vane, a support strut, and a reinforcement platform. The vane may include an outer platform, an inner platform spaced apart radially from the outer platform relative to an axis, and an aerofoil that extends radially between the outer platform and the inner platform. The support strut may extend radially through the aerofoil. The reinforcement platform may be coupled with the support strut to locate the inner platform of the vane radially between the reinforcement platform and the outer platform of the vane.

In some embodiments, the entire reinforcement platform may be spaced apart from the inner platform. In some embodiments, the reinforcement platform may be cantilevered from the support strut.

In some embodiments, the reinforcement platform may include a wall and a lip. The wall may extend axially and circumferentially. The lip may extend radially away from the wall toward the axis and circumferentially relative to the axis.

In some embodiments, the turbine vane assembly includes an inner seal coupled with the support strut to locate the reinforcement platform radially between the inner platform and the inner seal.

In some embodiments, the turbine vane assembly includes a buffer seal. The buffer seal may be coupled with the support strut to locate the reinforcement platform radially between the buffer seal and the inner platform. The buffer seal may include an axial wall and a seal flange that extends radially outward away from the axial wall and toward the reinforcement platform.

In some embodiments, the vane may comprise ceramic materials. The reinforcement platform may comprise metallic materials.

According to another aspect of the present disclosure, a method may include a number of steps. The method may include providing a turbine vane assembly having a vane, a support strut, and a reinforcement platform, the vane includes an outer platform, an inner platform spaced apart radially from the outer platform relative to an axis to define a gas path therebetween, and an aerofoil that extends radially between the outer platform and the inner platform, the support strut extends radially through the aerofoil, and the reinforcement platform being coupled with the support strut to define an outer chamber located radially between the reinforcement platform and the inner platform and an inner chamber located radially inward of the reinforcement platform, conducting working fluid through the gas path at a first pressure, supplying gas to the inner chamber at a second pressure to cause the inner chamber to have the second pressure, the second pressure being greater than the first pressure, and directing a portion of the gas from the inner chamber into the outer chamber to cause the outer chamber to have a third pressure, the third pressure being greater than the first pressure and less than the second pressure.

In some embodiments, the method includes providing a rotating component axially adjacent the turbine vane assembly. The rotating component may include an outer seal that extends axially toward the turbine vane assembly to locate the outer seal radially between the inner platform and the reinforcement platform and an inner seal that extends axially toward the turbine vane assembly to locate the inner seal radially inward of the reinforcement platform.

The method may include conducting axial flow of the working fluid in the outer chamber from a fore end of the turbine vane assembly to an aft end of the turbine vane assembly. The method may include blocking axial flow of the gas along a portion of a surface of the reinforcement platform.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
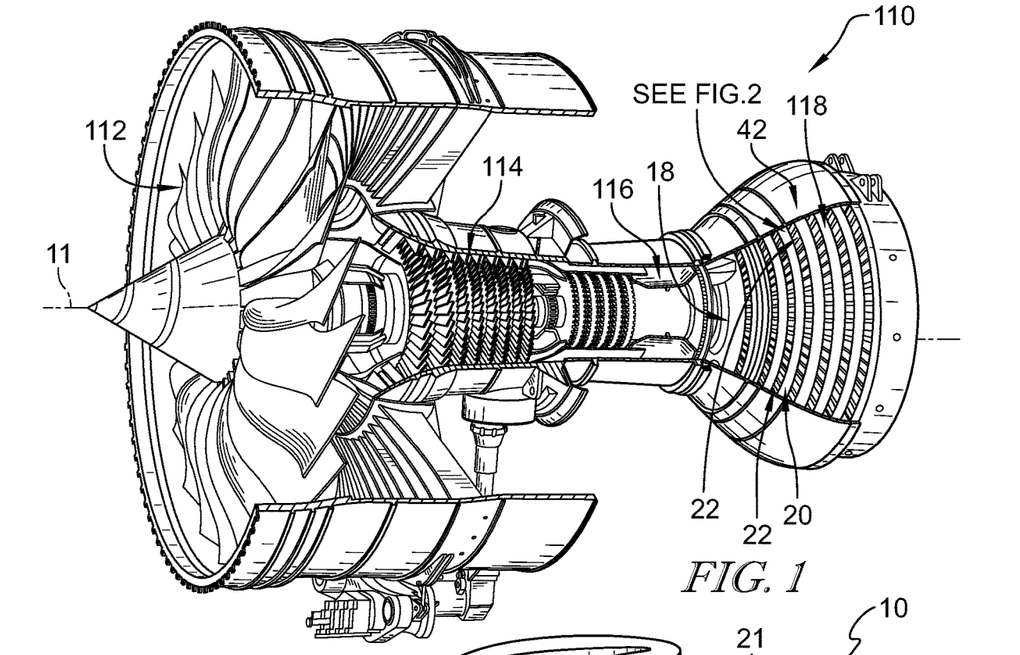
FIG. 1 is a cutaway view of a gas turbine engine that includes a fan, a compressor, a combustor, and a turbine, the turbine including static turbine vane rings configured to direct air into adjacent rotating wheel assemblies.
Figure 2:
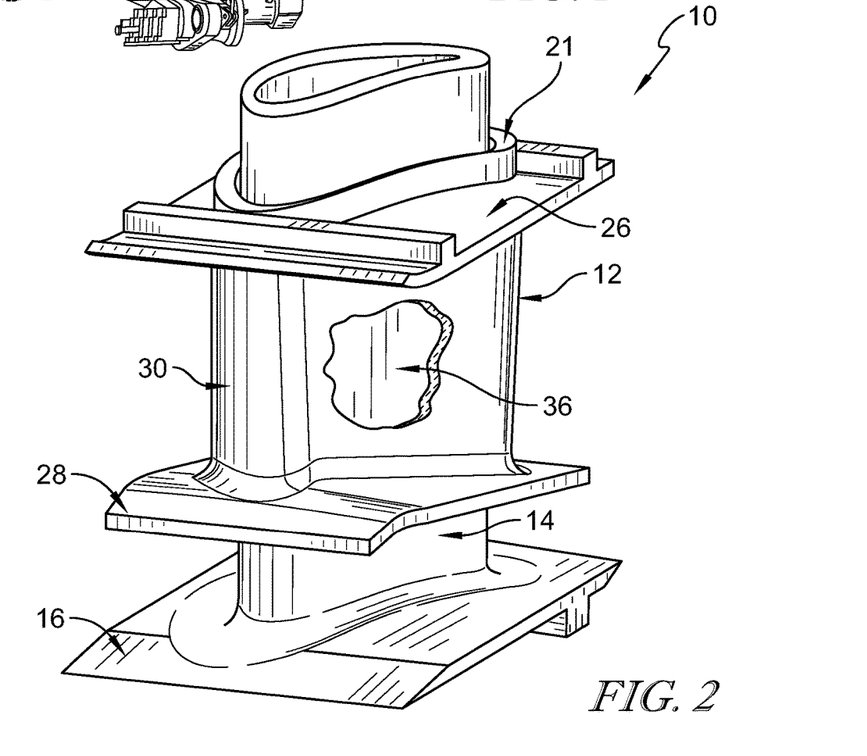
FIG. 2 is a perspective view of a turbine vane assembly in accordance with the present disclosure of one of the turbine vane rings of FIG. 1 showing that the turbine vane assembly includes a vane adapted to interact with hot gases, a support strut located within the vane to receive force loads from the vane, and a reinforcement platform coupled with the support strut to reduce magnitude of the force loads applied to platforms of the vane.

A turbine vane assembly 10 for use in a gas turbine engine 110 is shown in FIG. 2. The illustrative turbine vane assembly 10 includes a ceramic matrix composite vane 12, a metallic support strut 14, and a metallic reinforcement platform 16 as shown in FIGS. 2-5. The ceramic matrix composite vane 12 interacts with hot gases conducted through a gas path 18 of the gas turbine engine 110 and conducts the hot gases around the turbine vane assembly 10 toward a rotating wheel assembly 22 located downstream of the turbine vane assembly 10 as suggested in FIGS. 1 and 2. The metallic support strut 14 extends through the ceramic matrix composite vane 12 and receives force loads applied to the ceramic matrix composite vane 12 by the hot gases. The metallic reinforcement platform 16 provides an intermediate pressure region 50 that diverts a portion of the force loads from the vane 12 to the metallic reinforcement platform 16 and transfers the portion of the force loads to the metallic support strut 14 to reduce the force loads applied to the ceramic matrix composite vane 12.

The ceramic matrix composite vane 12 is adapted to withstand high temperatures, but may have relatively low strength compared to the metallic support strut 14. The support strut 14 provides structural strength to the turbine vane assembly 10 by receiving the force loads applied to the vane 12 and transferring them to a casing that surrounds the turbine vane assembly 10. The support strut 14 and reinforcement platform 16 may not be capable of withstanding directly the high temperatures experienced by the vane 12.

The metallic reinforcement platform 16 reduces the force loads applied to the relatively low strength ceramic matrix composite vane 12. The metallic reinforcement platform 16 provides a seal between turbine chambers 50, 52 having different pressures as suggested in FIG. 4. The force loads caused by the pressure difference between the chambers 50, 52 is applied through the metallic reinforcement platform 16 to the support strut 14 so that the pressure difference and, thus, the force loads, acting on the ceramic matrix composite vane 12 are reduced. As a result, the ceramic matrix composite vane 12 is exposed to the high temperature gases in the gas path 18 where it can withstand the hot temperatures while the metallic reinforcement platform 16 is exposed to a relatively lower temperature environment and reduces the force loads applied to the relatively lower strength ceramic matrix composite vane 12.

In illustrative embodiments, the vane 12 comprises ceramic materials while the support strut 14 and reinforcement platform 16 comprise metallic materials. Illustratively, the vane 12 comprises ceramic matrix composite materials. In other embodiments, each of the vane 12, support strut 14, and reinforcement platform 16 may comprise any suitable materials including ceramics, ceramic matrix composites, metals, alloys, super alloys, etc.

The turbine vane assembly 10 is adapted for use in the gas turbine engine 110 which includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis 11 of the gas turbine engine 110 and drive the compressor 114 and the fan 112. In other embodiments, the fan 112 may be omitted and the turbine 118 drives a propeller, drive shaft, or other suitable alternative.

The turbine 118 includes a plurality of static turbine vane rings 20 that are fixed relative to the axis 11 and a plurality of bladed wheel assemblies 22 as suggested in FIG. 1. Each turbine vane ring 20 includes a plurality of turbine vane assemblies 10. The hot gases are conducted through the gas path 18 and interact with the bladed wheel assemblies 22 to cause the bladed wheel assemblies 22 to rotate about the axis 11. The turbine vane rings 20 are positioned to direct the gases toward the bladed wheel assemblies 22 with a desired orientation.

Figure 3:
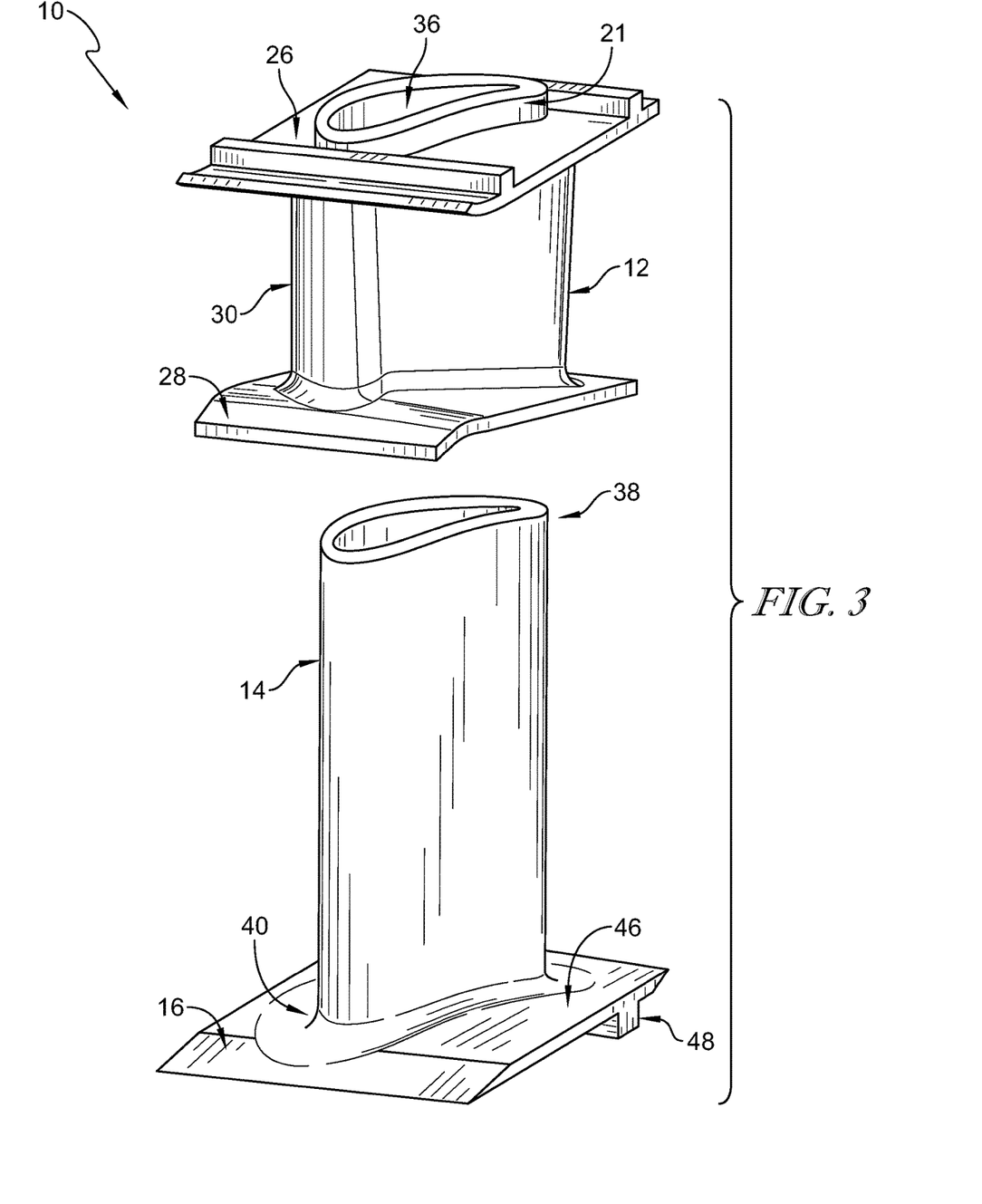
FIG. 3 is an exploded view of the turbine vane assembly of FIG. 2 showing the turbine vane assembly includes the vane having an outer platform, an inner platform, and an aerofoil; the support strut configured to be received in an internal cavity of the aerofoil; and the reinforcement platform coupled with the support strut.

The vane 12 of each turbine vane assembly 10 includes an outer platform 26, an inner platform 28, and an aerofoil 30 as shown in FIGS. 2 and 3. The outer platform 26 defines an outer boundary 32 of the gas path 18 as suggested in FIG. 4. The inner platform 28 is spaced apart radially from the outer platform 26 relative to the axis 11 to define an inner boundary 34 of the gas path 18 as suggested in FIG. 4. The aerofoil 30 extends radially between and interconnects the outer platform 26 and the inner platform 28. The aerofoil 30 is shaped to redirect gases flowing through the gas path 18 and to shield the support strut 14 from the hot gases in the gas path 18.

The aerofoil 30 is also formed to define an interior cavity 36 that extends radially into the aerofoil 30 as shown in FIG. 3. Illustratively, the interior cavity 36 extends radially entirely through the outer platform 26, the inner platform 28, and the aerofoil 30. In the illustrative embodiment, the vane 12 is formed to include an outer brim 21 that extends radially outward from the outer platform 26 and an inner brim 23 that extends radially inward from the inner platform 28 as shown in FIG. 4.

In the illustrative embodiment, the outer platform 26, the inner platform 28, and the aerofoil 30 of the vane 12 are integrally formed from ceramic matrix composite materials. As such, the outer platform 26, the inner platform 28, and the aerofoil 30 provide a single, integral, one-piece vane 12 as shown in FIG. 3. In other embodiments, the outer platform 26, the inner platform 28, and the aerofoil 30 may be formed as separate components and coupled together.

Figure 4:
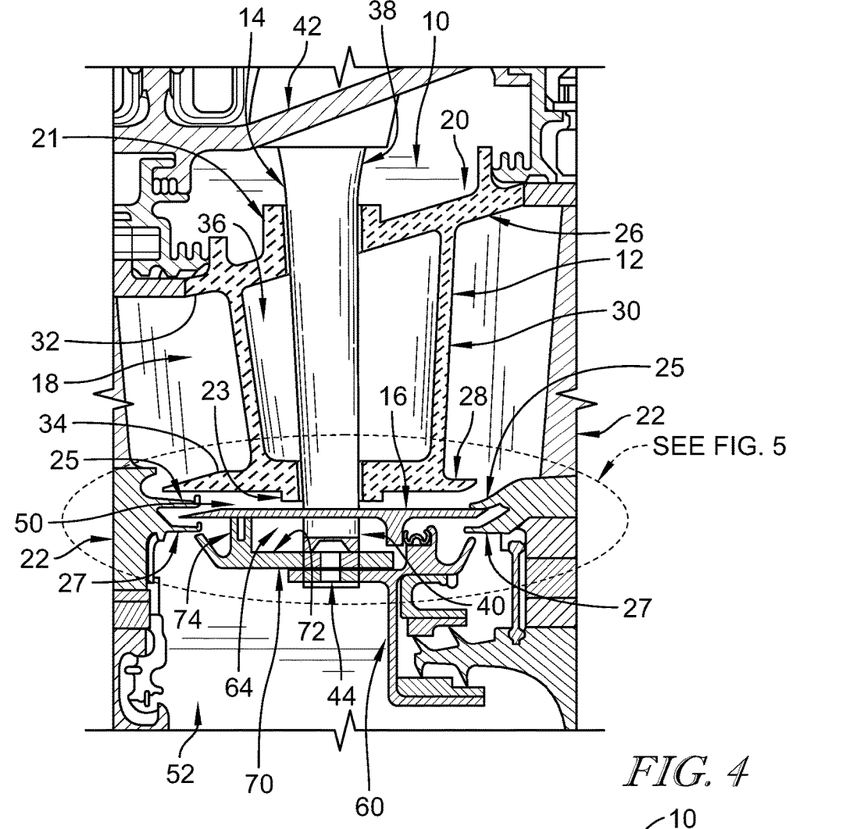
FIG. 4 is a section view of a portion of the turbine included in the gas turbine engine of FIG. 1 showing the turbine vane assembly and portions of the turbine casing and rotating wheel assemblies.

The support strut 14 is engaged, directly or indirectly via load pads, seals, etc., with the vane 12 to receive force loads from the vane 12 and to transfer the force loads to the casing 42 as suggested in FIG. 4. The support strut 14 is located in the interior cavity 36 and extends radially through the outer platform 26, the inner platform 28, and the aerofoil 30 as shown in FIG. 4.

The support strut 14 extends radially between a first end 38 and a second end 40 as shown in FIG. 3. The first end 38 is located radially outward of the outer platform 26 and the second end 40 is located radially inward of the inner platform 28. The support strut 14 extends radially inward beyond the inner platform 28 to locate the inner platform 28 between the first end 38 and the second end 40 of the support strut 14. The support strut 14 extends radially outward beyond the outer platform 26. The first end 38 of the support strut 14 is coupled to the casing 42 arranged around the turbine vane assembly 10. The support strut 14 is cantilevered from the casing 42 in the illustrative embodiment, the second end 40 being free.

The support strut 14 is hollow in the illustrative embodiment. In some embodiments, the support strut 14 includes holes that extend through the support strut 14 to allow cooling air to pass through the hollow support strut 14 and flow into the interior cavity 36. In other embodiments, the support strut 14 is solid material between the first end 38 to the second end 40. The support strut 14 is formed to receive a fastener 44 to couple seals 60, 70 to the support strut 14.

The reinforcement platform 16 is coupled with the support strut 14 to locate the inner platform 28 radially between the reinforcement platform 16 and the outer platform 26. Illustratively, the reinforcement platform 16 is machined to be formed with the support strut 14 as a single piece, unitary component. In some embodiments, the reinforcement platform 16 is fastened, brazed, welded, bonded, interference fitted, integrally formed with, or otherwise coupled with the support strut 14. The reinforcement platform 16 is cantilevered from the support strut 14 in an axial fore direction and in an axial aft direction. The reinforcement platform 16 is cantilevered from the support strut 14 in first circumferential direction and in a second circumferential direction.

The reinforcement platform 16 includes a wall 46 and a lip 48 as shown in FIG. 3. The wall 46 extends circumferentially and axially relative to the axis 11 as shown in FIG. 3. The wall 46 cooperates with sealing features 25, 27 included in the rotating wheel assemblies 22 and located fore and aft of the turbine vane assembly 10 to block radial flow of gases there between as suggested in FIG. 5. The lip 48 extends circumferentially and radially inward away from the wall 46 toward the axis 11. The lip 48 engages an inner seal 60 to block axial fluid flow between the inner seal 60 and the reinforcement platform 16.

The gases conducted through the gas path 18 have a first pressure (relatively low pressure) that is applied to the vane 12. As such, the pressure of the gases in the gas path 18 is applied to the outer platform 26, the inner platform 28, and the aerofoil 30. The inner platform 28 cooperates with outer sealing features 25 of the rotating wheel assemblies 22 to block the gases in the gas path 18 from flowing radially inwardly. Some gases may still escape from the gas path 18 during use of the gas turbine engine 110.

Figure 5:
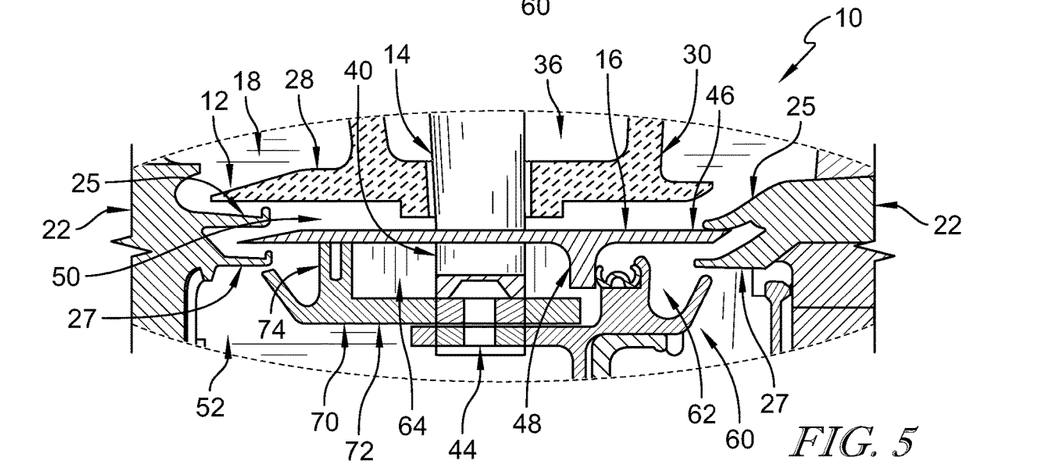
FIG. 5 is an enlarged view of FIG. 4 showing a sealing arrangement between the turbine vane assembly and the rotating wheel assemblies located fore and aft of the turbine vane assembly.

The reinforcement platform 16 is spaced apart radially from the inner platform 28 to define an outer chamber 50 radially between the reinforcement platform 16 and the inner platform 28 as shown in FIGS. 4 and 5. The outer chamber 50 is filled with relatively cool gases received from an inner chamber 52. The reinforcement platform 16 cooperates with the sealing features 25, 27 and the inner platform 28 cooperates with the outer sealing features 25 to block the gases in the outer chamber 50 from flowing radially inwardly or outwardly.

Some gases may escape from the outer chamber 50 during use of the gas turbine engine 110. The gases in the outer chamber 50 have a second pressure (relatively intermediate/medium pressure) that is greater than the first pressure. Typically, if gases pass through the seal between the inner platform 28 and the outer sealing features 25, the gases in the outer chamber 50 flow radially outward into the gas path 18 instead of hot gas path gases flowing into the outer chamber 50. As a result, the reinforcement platform 16 may be subject to lower temperatures than the inner platform 28.

The inner chamber 52 is defined radially inward of the reinforcement platform 16 as shown in FIG. 4. The inner chamber 52 is filled with cooling gases having a third pressure (relatively high pressure). The third pressure is greater than the second pressure. As such, the pressure in the inner chamber 52 is greater than the pressure in the outer chamber 50 during use of the gas turbine engine 110.

Some gases may escape from the inner chamber 52 during use of the gas turbine engine 110. The gases in the inner chamber 52 have the third pressure that is greater than the second pressure. Typically, if gases pass through the seal between the reinforcement platform 16 and the inner sealing features 27, the gases in the inner chamber 52 flow radially outward into the outer chamber 50.

The first, second, and third pressure create pressure differences between the gas path 18, the outer chamber 50, and the inner chamber 52. Without the reinforcement platform 16, a large pressure difference created by the first pressure in the gas path 18 and the third pressure in the inner chamber 52 would be applied to the ceramic matrix composite inner platform 28. The large pressure difference would cause a relatively large force load to be applied to the ceramic matrix composite inner platform 28. Such a large force may cause the ceramic matrix composite inner platform 28 to exceed stress limits or cause the inner platform 28 to be designed as a larger feature to increase its strength.

The present disclosure provides the reinforcement platform 16 to reduce the force loads acting on the inner platform 28 by reducing the pressure difference between the gases acting on the inner platform 28. The reinforcement platform 16 defines the outer chamber 50 with the second pressure. As a result, the pressure difference acting on the inner platform 28 is created by the first pressure in the gas path 18 and the second pressure in the outer chamber 50. The second pressure is less than the third pressure, so the pressure difference is less and, thus, the force loads on the inner platform are less than if no reinforcement platform 16 is present.

A pressure difference between the second pressure in the outer chamber 50 and the third pressure in the inner chamber 52 is applied to the reinforcement platform 16 as a force load. That force load is transferred to the support strut 14 and to the casing 42. Therefore, the force load is not applied to the inner platform 28. Illustratively, the entire reinforcement platform 16 is space apart from the inner platform 28 to avoid transferring force loads from the reinforcement platform 16 to the inner platform 28.

Illustratively, the turbine vane assembly 10 further includes the inner seal 60 and a buffer seal 70 as shown in FIG. 4. The inner seal 60 is configured to block gas from passing between the inner seal 60 and the rotating wheel assembly 22 located adjacent the inner seal 60. The buffer seal 70 is configured to block axial flow through the outer chamber 50 between a fore end of the reinforcement platform 16 and an aft end of the reinforcement platform 16.

The inner seal 60 is coupled with the support strut 14 at the second end 40 of the support strut 14 to locate the reinforcement platform 16 radially between the inner platform 28 and the inner seal 60 as shown in FIG. 4. The inner seal 60 cooperates with the rotating wheel assembly 22 to block axial and radial flow of gases in the inner chamber 52 into the outer chamber 50.

The reinforcement platform 16 is spaced apart radially from the inner platform 28 to define the outer chamber radially between the reinforcement platform 16 and the inner platform 28. The inner seal 60 is spaced apart radially from the reinforcement platform 16 to define a buffer chamber 64 radially between the reinforcement platform 16 and the inner seal 60.

The lip 48 of the reinforcement platform 16 cooperates with a rim 62 of the inner seal 60 to block axial fluid flow between the inner seal 60 and the reinforcement platform 16. The buffer seal 70 and the inner seal 60 block fluid flow into and out of the buffer chamber 64.

The buffer seal 70 is coupled with the support strut 14 to locate the reinforcement platform 16 radially between the buffer seal 70 and the inner platform 28. The buffer seal 70 includes an axial wall 72 and a seal flange 74 that extends radially outward away from the axial wall 72 and toward the reinforcement platform 16 to block axial fluid flow between the buffer seal 70 and the reinforcement platform 16.

According to an aspect of the present disclosure, a method includes conducting working fluid through the gas path 18 at a first pressure, supplying sealing gas to the inner chamber 52 at a second pressure to cause the inner chamber 52 to have the second pressure, and directing a portion of the sealing gas from the inner chamber 52 into the outer chamber 50 to cause the outer chamber 50 to have a third pressure. The second pressure being greater than the first pressure. The third pressure being greater than the first pressure and less than the second pressure.

In some embodiments, the method includes providing a rotating component 22 axially adjacent the turbine vane assembly 10. The rotating component 22 including an outer seal 25 that extends axially toward the turbine vane assembly 10 to locate the outer seal 25 radially between the inner platform 28 and the reinforcement platform 16 and an inner seal 27 that extends axially toward the turbine vane assembly 10 to locate the inner seal 27 radially inward of the reinforcement platform 16.

In some embodiments, the method includes conducting axial flow of the working fluid in the outer chamber 50 from a fore end of the turbine vane assembly 10 to an aft end of the turbine vane assembly 10. In some embodiments, the method includes blocking axial flow of the sealing gas along a portion of a surface of the reinforcement platform.

Some nozzle guide vane platforms may experience a high pressure ratio across the lower platform as a result of redirecting low speed air flow, approximately between 15 percent and 80 percent. The pressure difference may induce high stress concentrations at the fillet joint between the platform and aerofoil.

If the high stress concentrations are not addressed in some vanes, they may cause ceramic matrix composite sections to crack and/or break off which may create domestic object damage (DOD) for components downstream. Some vanes may be liable to holing, which can cause insufficient cooling or ingestion of hot gases onto the spars inside, potentially leading to a shut down of the gas turbine engine. Losing the platform or sections of the vane may reduce or eliminate the functions of supporting the vane and maintaining the pressure difference across the platform.

According to an embodiment of the present disclosure, an additional metallic platform 16 is provided on the non-gas path side of the ceramic matrix composite platform 28 on a high pressure stage two nozzle guide vane 10. The additional platform 16 may reduce high stress concentrations on the fillets of the ceramic matrix composite platforms 26, 28. The additional platform 16 may reduce stress concentrations by allowing for a medium/intermediate pressure to be maintained between the high pressure zone radially inward of the vane 10 and the low pressure zone of the gas path 18.

Ceramic matrix composites may feature improved properties when subjected to high temperatures compared to the conventional material of choice for gas turbine engines, Nickel based super alloys. This benefit may allow for a reduction in cooling air flow to be used on the ceramic matrix composite components, resulting in an increase in thermal efficiency and, thus, improving specific fuel capacity. In order to improve upon the current design of components, a solution may be desired which ensures the structural integrity of the vane whilst maintaining an efficient seal across the pressure gradient.

Conventional designs typically include an upper and lower platform with a large pressure gradient. An intermediate pressure as provided by the present disclosure may reduce platform and seal stresses by utilising both ceramic matrix composite and metal properties.

The present disclosure details how an intermediate pressure would be achieved, by the addition of a metallic platform 16 on the non-gas path side of the ceramic matrix composite platform 28. This additional platform 16 may allow for a medium pressure to be maintained between the high and low pressure zones. The medium pressure could be a relatively low or even negative pressure margin such that some hot-gas may be ingested into the chamber. The ceramic matrix composite can likely tolerate the temperature of the ingested gas and the metallic platform 16 feature is designed to tolerate this thermal loading. Additional seals may be used with this design to maintain the medium pressure.

The additional seals for this design can be replicated from existing seal geometry of the current design with an alteration of the main fixture. This configuration of an additional platform will also provide the benefit of additional discouragers. Additional discouragers are also an added beneficial feature of this design.

One region of the gas turbine engine that is both hot enough to warrant the cost of integrating ceramic matrix composite into the design and not too hot to overheat the material, is the High Pressure Stage two (HP2) of the turbines. The material could be used in High Pressure Stage two blades, seal segments and nozzle guide vanes. Thus, the present disclosure applies to other non-ceramic nozzle guide vanes to reduce the high regions of stressed caused by the pressure gradient across the nozzle guide vanes.

Aspects of the present design uses the desirable temperature qualities of the ceramic matrix composite platform 28 within the hot region 18, and the strength properties of the metal platform 16 in the cooler, lower pressure region 50, 52. This concept may improve the in-service durability and potentially increase the life of the ceramic matrix composite vane 12.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly for a gas turbine engine, the turbine vane assembly comprising
a ceramic matrix composite vane adapted to conduct hot gases flowing through a gas path of the gas turbine engine around the turbine vane assembly during use of the turbine vane assembly, the ceramic matrix composite vane includes an outer platform that defines an outer boundary of the gas path, an inner platform spaced apart radially from the outer platform relative to an axis to define an inner boundary of the gas path, and an aerofoil that extends radially between and interconnects the outer platform and the inner platform, and the aerofoil is formed to define an interior cavity that extends radially through the aerofoil,
a metallic support strut located in the interior cavity formed in the aerofoil and configured to receive force loads applied to the ceramic matrix composite vane by the hot gases during use of the turbine vane assembly,
a metallic reinforcement platform coupled with the metallic support strut to locate the metallic reinforcement platform radially between the inner platform of the ceramic matrix composite vane and the axis, wherein a portion of the force loads are applied to the metallic reinforcement platform instead of the inner platform during use of the turbine vane assembly and the portion of the force loads are transferred from the metallic reinforcement platform to the metallic support strut so that a total amount of the force loads applied to the ceramic matrix composite vane is reduced,
an inner seal configured to block gas from passing between the inner seal and a rotor located adjacent the inner seal and wherein the inner seal is coupled with the metallic support strut to locate the metallic reinforcement platform radially between the inner platform and the inner seal, and
a buffer seal coupled with the metallic support strut to locate the metallic reinforcement platform radially between the buffer seal and the inner platform and the buffer seal includes an axial wall and a seal flange that extends radially outward away from the axial wall and toward the metallic reinforcement platform to block axial fluid flow between the buffer seal and the metallic reinforcement platform,
wherein the metallic reinforcement platform includes a wall and a lip, the wall extends axially and circumferentially and the lip extends radially away from the wall toward the axis and circumferentially and engages the inner seal to block axial fluid flow between the inner seal and the metallic reinforcement platform.

2. The turbine vane assembly of claim 1, wherein the metallic reinforcement platform is spaced apart radially from the inner platform to define a first chamber radially between the metallic reinforcement platform and the inner platform and the inner seal is spaced apart radially from the metallic reinforcement platform to define a second chamber radially between the metallic reinforcement platform and the inner seal.

3. The turbine vane assembly of claim 1, wherein the metallic reinforcement platform includes a wall and a lip, the wall extends axially and circumferentially and the lip extends radially away from the wall toward the axis and circumferentially relative to the axis.

4. The turbine vane assembly of claim 1, wherein the metallic reinforcement platform axially and circumferentially surrounds the metallic support strut.

5. The turbine vane assembly of claim 1, wherein the entire metallic reinforcement platform is spaced apart from the inner platform.

6. The turbine vane assembly of claim 1, wherein the metallic reinforcement platform is cantilevered from the metallic support strut in an axial fore direction and in an axial aft direction.

7. A turbine vane assembly comprising
a vane that includes an outer platform, an inner platform spaced apart radially from the outer platform relative to an axis, and an aerofoil that extends radially between the outer platform and the inner platform,
a support strut that extends radially through the aerofoil,
a reinforcement platform coupled with the support strut to locate the inner platform of the vane radially between the reinforcement platform and the outer platform of the vane,
an inner seal coupled with the support strut to locate the reinforcement platform radially between the inner platform and the inner seal, and
a buffer seal coupled with the support strut to locate the reinforcement platform radially between the buffer seal and the inner platform and the buffer seal includes an axial wall and a seal flange that extends radially outward away from the axial wall and toward the reinforcement platform.

8. The turbine vane assembly of claim 7, wherein the reinforcement platform includes a wall and a lip, the wall extends axially and circumferentially, and the lip extends radially away from the wall toward the axis and circumferentially relative to the axis.

9. The turbine vane assembly of claim 7, wherein the reinforcement platform is cantilevered from the support strut.

10. The turbine vane assembly of claim 7, wherein the vane comprises ceramic materials and the reinforcement platform comprises metallic materials.

11. The turbine vane assembly of claim 7, wherein a first chamber is defined radially between the inner platform and the reinforcement platform.

12. The turbine vane assembly of claim 7, wherein the entire reinforcement platform is radially spaced apart from the inner platform.

13. The turbine vane assembly of claim 7, wherein the reinforcement platform is spaced apart radially from the inner platform to define a first chamber radially between the reinforcement platform and the inner platform and the inner seal is spaced apart radially from the reinforcement platform to define a second chamber radially between the reinforcement platform and the inner seal.

* * * * *